(12) United States Patent
BenHanokh et al.

(10) Patent No.: US 12,461,666 B2
(45) Date of Patent: Nov. 4, 2025

(54) REDUCING POWER CONSUMPTION BY USING A DIFFERENT MEMORY CHIP FOR BACKGROUND PROCESSING

(71) Applicant: RED HAT, INC., Raleigh, NC (US)

(72) Inventors: Gabriel Zvi BenHanokh, Tel-Aviv (IL); Adam Kupczyk, Tulce (PL)

(73) Assignee: Red Hat, Inc., Raleigh, NC (US)

( * ) Notice: Subject to any disclaimer, the term of this patent is extended or adjusted under 35 U.S.C. 154(b) by 21 days.

(21) Appl. No.: 17/480,527

(22) Filed: Sep. 21, 2021

(65) Prior Publication Data

US 2023/0088572 A1 Mar. 23, 2023

(51) Int. Cl.
 *G06F 3/06* (2006.01)

(52) U.S. Cl.
 CPC .......... *G06F 3/0625* (2013.01); *G06F 3/0647* (2013.01); *G06F 3/0653* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,971,081 B2 | 6/2011 | Cooper et al. | |
| 9,116,700 B2 | 8/2015 | Chinnakkonda Vidyapoornachary et al. | |
| 9,454,214 B2 | 9/2016 | Bahnsen et al. | |
| 9,891,694 B2 | 2/2018 | Taha et al. | |
| 2008/0140921 A1* | 6/2008 | Sutardja | G06F 3/0625 711/E12.019 |
| 2011/0310067 A1* | 12/2011 | Miura | G06F 3/0482 345/184 |
| 2014/0089711 A1 | 3/2014 | Balasundaram | |
| 2015/0113214 A1* | 4/2015 | Sutardja | G06F 3/0656 711/106 |
| 2015/0162069 A1 | 6/2015 | Matsushima | |
| 2016/0196006 A1* | 7/2016 | Doan | G06F 3/0488 715/779 |
| 2016/0335200 A1* | 11/2016 | Cambou | G11C 11/4091 |
| 2017/0228012 A1* | 8/2017 | Shirota | G06F 1/329 |
| 2018/0107418 A1* | 4/2018 | Umeda | G06F 3/067 |
| 2018/0341431 A1* | 11/2018 | Hirobe | H01L 25/0657 |
| 2018/0364947 A1* | 12/2018 | Jean | G06F 3/0659 |

(Continued)

OTHER PUBLICATIONS

Nelius, J., "Intel's Launching a New Low Power Chip to Rival Qualcomm In Super Thin PCs," GIZMODO, 2020, https://gizmodo.com/intels-launching-a-new-low-power-chip-to-rival-qualcomm-1843968761.

(Continued)

*Primary Examiner* — Jared I Rutz
*Assistant Examiner* — Alexander J Yoon
(74) *Attorney, Agent, or Firm* — Kilpatrick Townsend & Stockton LLP

(57) ABSTRACT

Power consumption can be reduced by using a different memory chip for background processing. For example, a computing device can determine that a first application executing on a device complies with an application programming interface (API) for using a smaller dynamic access memory (DRAM) chip of the device that is smaller and consumes less power than a main DRAM chip of the device. The computing device can determine the device is inactive. The computing device can perform, by the API, background processing for the first application using the memory chip.

17 Claims, 3 Drawing Sheets

(56) References Cited

U.S. PATENT DOCUMENTS

2020/0201755 A1* 6/2020 Byun .................... G06F 3/0604
2021/0125657 A1* 4/2021 Biswas ............... G11C 11/4023
2021/0125664 A1* 4/2021 Holland ................ G11C 11/412

OTHER PUBLICATIONS

"Micron Readies World's First Multichip Package with LPDDR5 DRAM for Mass Production," Micron Technology, Inc., 2020, http://www.globenewswire.com/en/news-release/2020/10/20/2111031/14450/en/Micron-Readies-World-s-First-Multichip-Package-With-LPDDR5-DRAM-for-Mass-Production.html.

* cited by examiner

REDUCING POWER CONSUMPTION BY USING A DIFFERENT MEMORY CHIP FOR BACKGROUND PROCESSING

TECHNICAL FIELD

The present disclosure relates generally to computing device power consumption. More specifically, but not by way of limitation, this disclosure relates to reducing power consumption by using a different memory chip for background processing.

BACKGROUND

User devices, such as mobile phones, laptop computers, and desktop computer, often include a dynamic random access memory (DRAM). A bit of data can be stored in a memory cell of the DRAM, and each memory cell can include a capacitor and a transistor. The charge of the capacitor dissipates over time, which can lead to data being lost. To prevent losing data, DRAMs typically include a memory refresh circuit that periodically rewrites the data in the capacitor to restore the initial charge.

DETAILED DESCRIPTION

Figure 1:
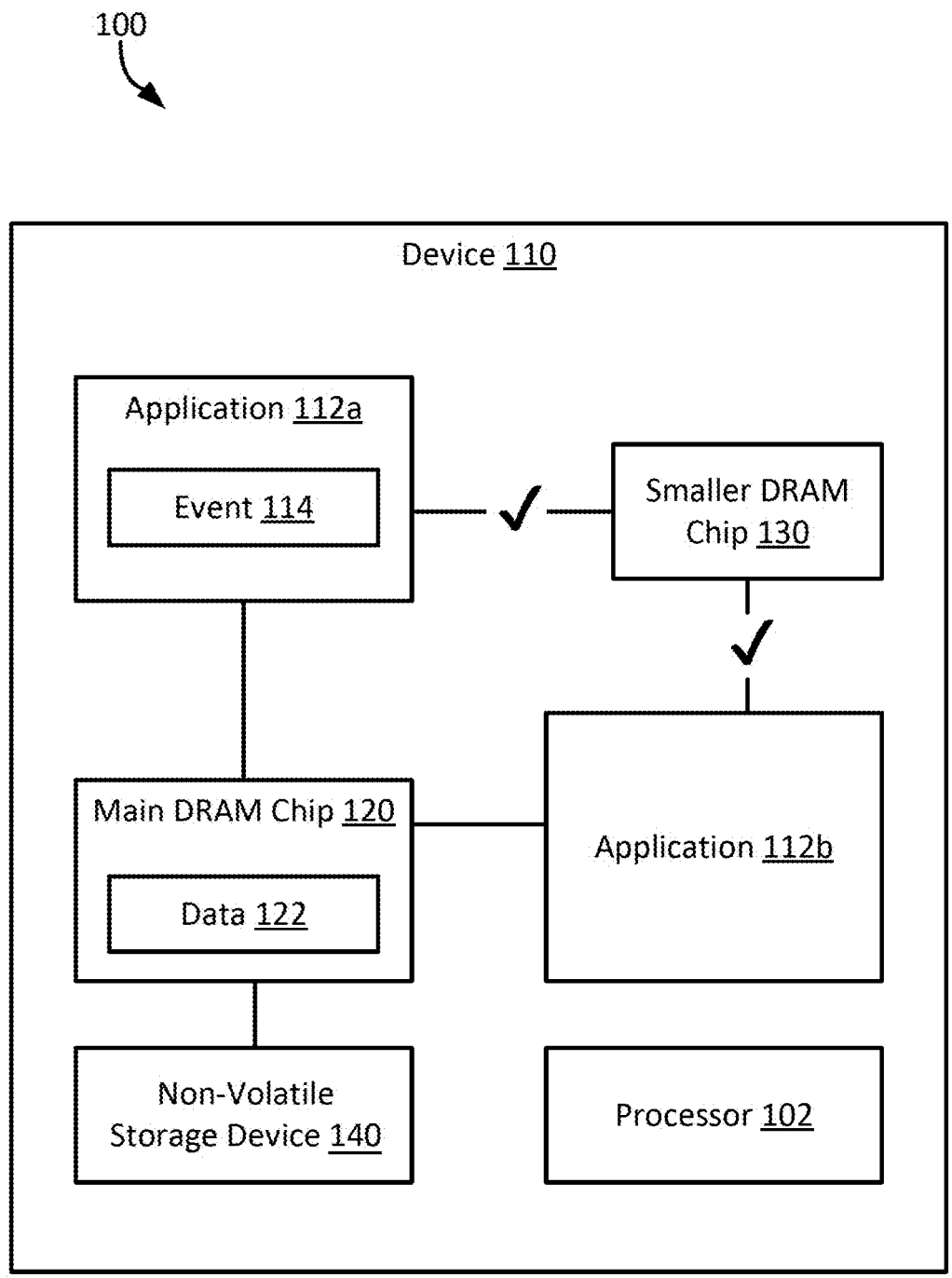
FIG. 1 is a block diagram of an example of a system for implementing power consumption reduction by using a different memory chip for background processing according to some aspects of the present disclosure.

A main dynamic random access memory (DRAM) chip of a device can consume a large amount of battery power as a result of continuously refreshing the main DRAM chip. The main DRAM chip may be used for both foreground processing and background processing. The background processing can involve polling for an event associated with a process, such as a software application. So, even if the device is inactive, the main DRAM chip receives power to keep refreshing the data, resulting in the large power consumption. To save power, when the user device becomes inactive, the voltage provided to the main DRAM chip may be reduced. But, the main DRAM chip is still refreshed, which consumes power and drains the battery.

Some examples of the present disclosure can overcome one or more of the abovementioned problems by providing a system that can use a different and smaller DRAM chip for background processing rather than the main DRAM chip to conserve battery power. For example, the system can determine that an application executing on a device complies with an application programming interface (API) for using a smaller DRAM chip of the device that is smaller and consumes less power than a main DRAM chip of the device. The application can comply with the API if a size of data associated with background processing of the application is less than a portion of the smaller DRAM chip that is allocated for the first application. The system can then determine the device is inactive and perform background processing for the first application by the API using the smaller DRAM chip. The system can supply a lower power level to the main DRAM chip while the device is inactive than when the device is active, since only the smaller DRAM chip may use power for the background processing while the device is inactive. Thus, the main DRAM chip can be used for foreground processing while the device is active, and the smaller DRAM chip can be used for background processing while the device is inactive, which can reduce battery power consumed by the main DRAM chip and extend battery life of the device. Alternatively, the smaller DRAM chip may be used for background processing and the main DRAM chip can be used for foreground processing while the device is active, further reducing battery power consumption of the device.

As an example, a mobile phone can be inactive for a predetermined period of time. An application that was running on the mobile phone can comply with an API for using a smaller DRAM chip of the mobile phone for background processing. Once the mobile phone is determined to be inactive, the API can use the smaller DRAM chip for background processing of the first application. A lower power level can then be supplied to the main DRAM chip, such as hibernating the main DRAM chip. Since the smaller DRAM chip consumes less power than the main DRAM chip, battery power of the mobile phone can be conserved.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing power consumption reduction by using a different memory chip for background processing according to some aspects of the present disclosure. The system 100 can include a device 110 that can run applications 112*a-b*. The device 110 can include a processor 102 in communication with the applications 112*a-b*, a main DRAM chip 120, a smaller DRAM chip 130, a non-volatile storage device 140. Examples of the device 110 can include a mobile phone, a laptop computer, a tablet, a server, or another user device. Examples of the non-volatile storage device 140 can include a hard drive, a flash memory device, a magnetoresistive random access memory (MRAM) device, etc. The smaller DRAM chip 130 can be smaller than the main DRAM chip 120, and thus consume less power than the main DRAM chip 120. For example, the smaller DRAM chip 130 may be sixty-four megabytes and the main DRAM chip 120 may be sixteen gigabytes.

In some examples, the processor 102 can execute an API that allocates space of the smaller DRAM chip 130 for background processing of applications executed on the device 110. The processor 102 can determine whether an application executing on the device 110 complies with the API prior to the smaller DRAM chip 130 being used for the background processing. To do this, the processor 102 can determine whether a size of data associated with the background processing for the application is less than a portion of the smaller DRAM chip 130 allocated for the application. For example, the API can allocate one megabyte of the smaller DRAM chip 130 for the application 112*a*. The processor 102 can determine that the background processing of the application 112*a* involves less than one megabyte of data, so the application 112*a* complies with the API, as indicated by the check mark shown between the application 112*a* and the smaller DRAM chip 130.

Background processing for the application 112*a* can occur when the device 110 is active or inactive. The background processing can involve polling for an event 114 associated with the application 112*a*. For example, if the application 112*a* is an email application, the background processing can involve polling for incoming emails. The device 110 may be considered to be inactive a predefined period of time subsequent to the device 110 being interacted with by a user. If the processor 102 determines the application 112*a* complies with the API, the processor 102 can then perform background processing for the application 112*a* using the API and the smaller DRAM chip 130. Meanwhile, the main DRAM chip 120 can perform foreground processing for the application 112*a*. Since the background processing is performed using the smaller DRAM chip 130 rather than the main DRAM chip 120, the processor 102 can supply less power to the main DRAM chip 120 than if the main DRAM chip 120 performs both the background processing and the foreground processing. As a result, less power can be consumed by the device 110 for background processing, and the battery power of the device 110 can last longer.

If the device 110 is determined to be inactive, prior to the processor 102 performing background processing for the application 112*a* using the smaller DRAM chip 130, the processor 102 can migrate data 122 associated with the application 112*a* from the main DRAM chip 120 to the non-volatile storage device 140. The main DRAM chip 120 can then be hibernated or shut down until the device 110 is determined to be active. While the main DRAM chip 120 is inactive, the smaller DRAM chip 130 can perform the background processing for the application 112*a*. If the event 114 occurs while background processing is being performed for the application 112*a*, the processor 102 can migrate the data 122 from the non-volatile storage memory device 140 to the main DRAM chip 120 and resume foreground processing of the application 112*a* using the main DRAM chip 120 while the smaller DRAM chip 130 performs the background processing of the application 112*a*. Alternatively, the processor 102 may delete the data 122 associated with the application 112*a* prior to performing background processing for the application 112*a* using the smaller DRAM chip 130 while the device 110 is inactive.

In some examples, the smaller DRAM chip 130 can be used for background processing of multiple applications while the device 110 is active or inactive. The smaller DRAM chip 130 may be used for any applications that comply with the API. If the applications 112*a-b* both comply with the API, the smaller DRAM chip 130 can be used for the background processing for both of the applications 112*a-b* while the device 110 is active or inactive. The processor 102 can provide a lower power level to the main DRAM chip 120 when the device 110 is inactive than when the device 110 is active. Supplying the lower power level may involve shutting off power to the main DRAM chip 120 if the device 110 is inactive and the applications 112*a-b* comply with the API.

FIG. 1 is illustrative and non-limiting. Other examples may include more components, fewer components, different components, or a different arrangement of the components shown in FIG. 1. For example, although the device 110 includes two applications in the example of FIG. 1, the device 110 may include a smaller or larger number of applications in other examples. Additionally, the device 110 may be any device that consumes battery power while waiting for an external event. For example, while the device 110 in FIG. 1 is described in relation to a mobile device or laptop, other examples may involve a wearable vital signs monitoring device or an irrigation system that keeps power in case of remote activation.

Figure 2:
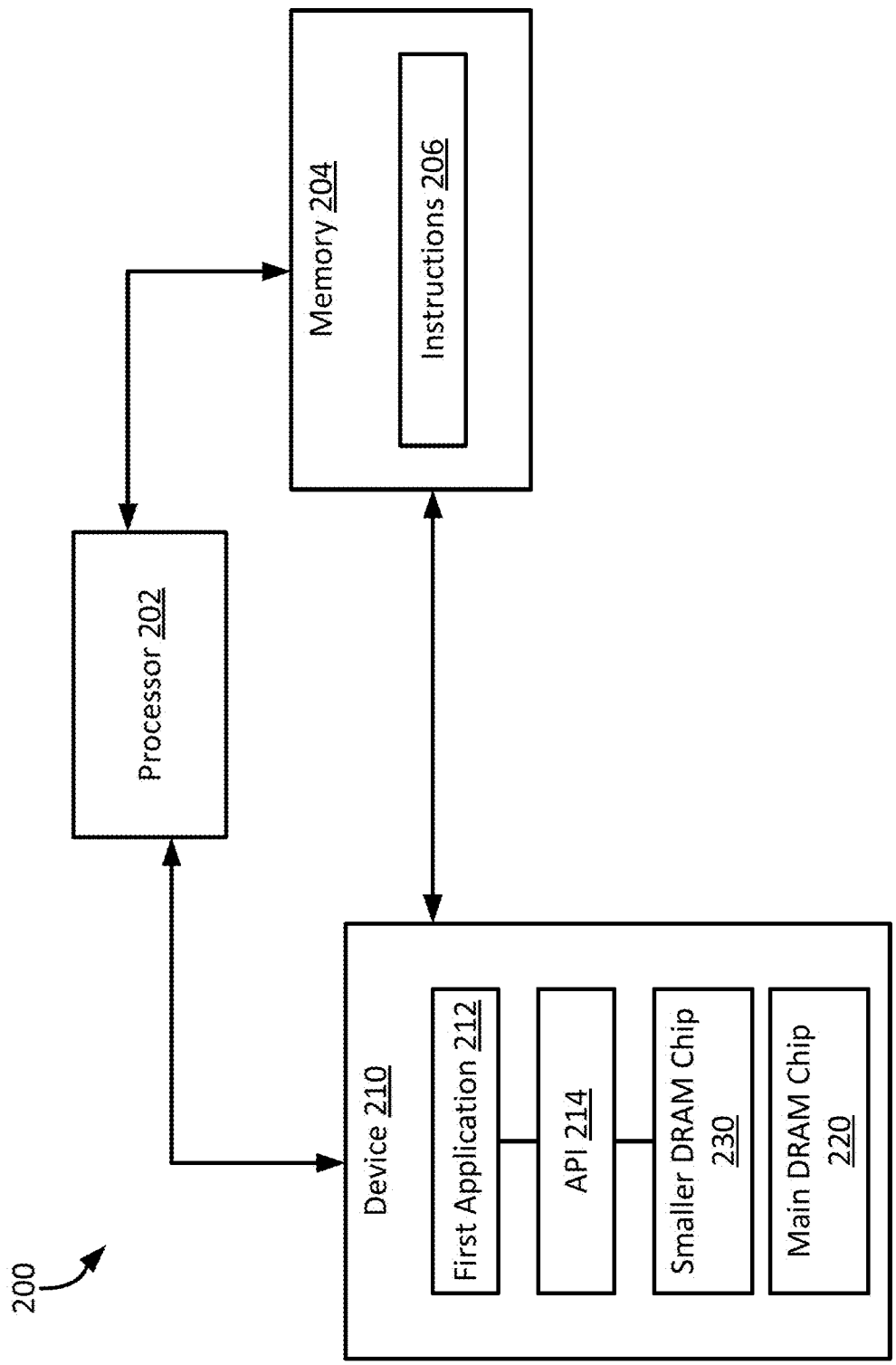
FIG. 2 is a block diagram of another system for implementing power consumption reduction using a different memory chip for background processing according to some aspects of the present disclosure.

FIG. 2 is a block diagram of another system 200 for implementing power consumption reduction by using a different memory chip for background processing according to some aspects of the present disclosure. The system 200 includes a device 210 that is communicatively coupled to a processor 202 and a memory 204. The processor 202 and the memory 204 may be part of the device 210.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processor 202 can execute the instructions 206 to perform operations. For example, the processor 202 can determine that a first application 212 executing on the device 210 complies with an API 214 for using a smaller DRAM chip 230 of the device 210. The smaller DRAM chip 230 can be smaller and consume less power than a main DRAM chip 220 of the device 210. The first application 212 can comply with the API 214 if a size of data associated with background processing of the first application 212 is less than a portion of the smaller DRAM chip 230 allocated for the first application 212. The processor 202 can determine the device 210 is inactive. For example, the processor 202 can determine operations for the device 210 have not been received for a predefined period of time. The processor 202 can then perform, by the API 214, background processing for the first application 212 using the smaller DRAM chip 230.

Figure 3:
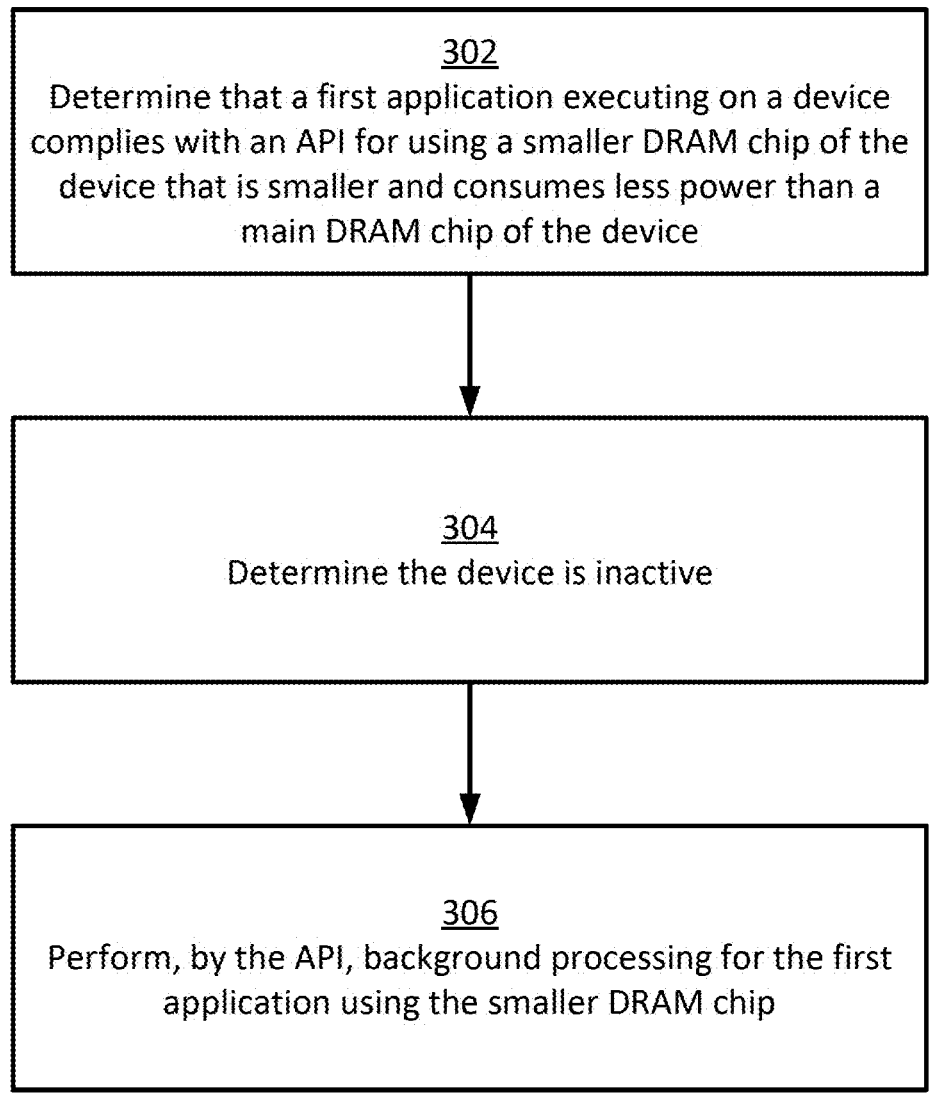
FIG. 3 is a flowchart of a process for implementing power consumption reduction by using a different memory chip for background processing according to some aspects of the present disclosure.

The processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 determines that a first application 212 executing on a device 210 complies with an API 214 for using a smaller DRAM chip 230 of the device 210 that is smaller and consumes less power than a main DRAM chip 220 of the device 210. The first application 212 can be determined to comply with the API 214 if a size of data for background processing of the first application 212 is smaller than a space of the smaller DRAM chip 230 that is allocated for the first application 212.

In block 304, the processor 202 determines the device 210 is inactive. Inactivity may be considered to occur a predefined period of time subsequent to the device 210 being interacted with by a user.

In block 306, the processor 202 performs, by the API 214, background processing for the first application 212 using the smaller DRAM chip 230. Prior to the processor 202 performing background processing for the first application 212 using the smaller DRAM chip 230, the processor 202 can migrate data associated with the first application 212 from the main DRAM chip 220 to a non-volatile storage device. Alternatively, the processor 202 may delete the data associated with the first application 212 prior to performing background processing for the first application 212 using the smaller DRAM chip 230. The processor 202 can supply a lower power level to the main DRAM chip 220 with the smaller DRAM chip 230 performing the background processing than if the main DRAM chip 220 were to perform the background processing. As a result, using the smaller DRAM chip 230 for background processes can conserve battery power of the device 210.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

What is claimed is:

1. A system comprising:
   a processor; and
   a memory including instructions that are executable by the processor for causing the processor to:
   determine a condition of an application programming interface (API) that is to be satisfied to use a smaller dynamic random access memory (DRAM) chip of a device that is smaller and consumes less power than a main DRAM chip of the device for background processing;
   determine a portion of the smaller DRAM chip that is allocated for a first application;
   determine, in response to determining that the condition is satisfied for the first application executing on the device, that the first application complies with the API for using the smaller DRAM chip for the background processing, the condition being associated with the portion of the smaller DRAM chip that is allocated for the first application;
   determine the device is inactive;
   perform, by the API and in response to determining that the device is inactive, the background processing for the first application using the smaller DRAM chip;
   determine that an event associated with the first application occurs;
   determine the device is active in response to determining that the event associated with the first application occurs; and
   in response to the event and determining that the device is active, perform foreground processing for the first application using the main DRAM chip while the smaller DRAM chip performs the background processing for the first application.

2. The system of claim 1, wherein the memory further includes instructions that are executable by the processor for causing the processor to:
   determine a plurality of applications executing on the device that comply with the API, the plurality of applications including the first application; and
   perform, by the API, background processing for each application of the plurality of applications using the smaller DRAM chip.

3. The system of claim 1, wherein the memory further includes instructions that are executable by the processor for causing the processor to determine the device is inactive by determining a predetermined time has passed subsequent to an operation being performed at the device.

4. The system of claim 1, wherein the memory further includes instructions that are executable by the processor for causing the processor to determine that the first application complies with the API by:
   determining a size of data associated with the background processing of the first application is less than the portion of the smaller DRAM chip allocated for the first application.

5. The system of claim 1, wherein the memory further includes instructions that are executable by the processor for causing the processor to:
   prior to performing the background processing with the smaller DRAM chip while the device is inactive, migrate data associated with the first application from the main DRAM chip to a non-volatile storage device; and
   in response to the event, migrate the data from the non-volatile storage device to the main DRAM chip.

6. The system of claim 1, wherein the memory further includes instructions that are executable by the processor for causing the processor to:
   prior to performing the background processing with the smaller DRAM chip while the device is inactive, delete data associated with the first application from the device.

7. A method comprising:
   determining a condition of an application programming interface (API) that is to be satisfied to use a smaller dynamic random access memory (DRAM) chip of a device that is smaller and consumes less power than a main DRAM chip of the device for background processing;
   determining a portion of the smaller DRAM chip that is allocated for a first application;
   determining, in response to determining that the condition is satisfied for the first application executing on the device, that the first application complies with the API for using the smaller DRAM chip for the background processing, the condition being associated with the portion of the smaller DRAM chip that is allocated for the first application;
   determining the device is inactive;
   performing, by the API and in response to determining that the device is inactive, the background processing for the first application using the smaller DRAM chip;
   determining that an event associated with the first application occurs;
   determining the device is active in response to determining that the event associated with the first application occurs; and
   in response to the event and determining that the device is active, performing foreground processing for the first application using the main DRAM chip while the smaller DRAM chip performs the background processing for the first application.

8. The method of claim 7, further comprising:
determining a plurality of applications executing on the device that comply with the API, the plurality of applications including the first application; and
performing, by the API, background processing for each application of the plurality of applications using the smaller DRAM chip.

9. The method of claim 7, wherein determining the device is inactive comprises determining a predetermined time has passed subsequent to an operation being performed at the device.

10. The method of claim 7, wherein determining that the first application complies with the API comprises:
determining a size of data associated with the background processing of the first application is less than the portion of the smaller DRAM chip allocated for the first application.

11. The method of claim 7, further comprising:
prior to performing the background processing with the smaller DRAM chip while the device is inactive, migrating data associated with the first application from the main DRAM chip to a non-volatile storage device; and
in response to the event, migrating the data from the non-volatile storage device to the main DRAM chip.

12. The method of claim 7, further comprising:
prior to performing the background processing with the smaller DRAM chip while the device is inactive, deleting data associated with the first application from the device.

13. A non-transitory computer-readable medium comprising program code that is executable by a processor for causing the processor to:
determine a condition of an application programming interface (API) that is to be satisfied to use a smaller dynamic random access memory (DRAM) chip of a device that is smaller and consumes less power than a main DRAM chip of the device for background processing;
determine a portion of the smaller DRAM chip that is allocated for a first application;
determine, in response to determining that the condition is satisfied for the first application executing on the device, that the first application complies with the API for using the smaller DRAM chip for the background processing, the condition being associated with the portion of the smaller DRAM chip that is allocated for the first application;
determine the device is inactive;
perform, by the API and in response to determining that the device is inactive, the background processing for the first application using the smaller DRAM chip;
determining that an event associated with the first application occurs;
determining the device is active in response to determining that the event associated with the first application occurs; and
in response to the event and determining that the device is active, performing foreground processing for the first application using the main DRAM chip while the smaller DRAM chip performs the background processing for the first application.

14. The non-transitory computer-readable medium of claim 13, further comprising program code that is executable by the processor for causing the processor to:
determine a plurality of applications executing on the device that comply with the API, the plurality of applications including the first application; and
perform, by the API, background processing for each application of the plurality of applications using the smaller DRAM chip.

15. The non-transitory computer-readable medium of claim 13, further comprising program code that is executable by the processor for causing the processor to determine the device is inactive by determining a predetermined time has passed subsequent to an operation being performed at the device.

16. The non-transitory computer-readable medium of claim 13, further comprising program code that is executable by the processor for causing the processor to determine that the first application complies with the API by:
determining a size of data associated with the background processing of the first application is less than the portion of the smaller DRAM chip allocated for the first application.

17. The non-transitory computer-readable medium of claim 13, further comprising program code that is executable by the processor for causing the processor to:
prior to performing the background processing with the smaller DRAM chip while the device is inactive, migrating data associated with the first application from the main DRAM chip to a non-volatile storage device; and
in response to the event, migrating the data from the non-volatile storage device to the main DRAM chip.

* * * * *